(12) United States Patent
Yan

(10) Patent No.: US 10,921,603 B2
(45) Date of Patent: Feb. 16, 2021

(54) WEARABLE DEVICE

(71) Applicant: SZ DJI TECHNOLOGY CO., LTD., Shenzhen (CN)

(72) Inventor: Shaojun Yan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/454,894

(22) Filed: Jun. 27, 2019

(65) Prior Publication Data

US 2019/0317332 A1 Oct. 17, 2019

Related U.S. Application Data

(63) Continuation of application No. PCT/CN2017/074144, filed on Feb. 20, 2017.

(30) Foreign Application Priority Data

Dec. 30, 2016 (CN) .......................... 201621493017.6

(51) Int. Cl.
*G02B 27/01* (2006.01)
*G06F 1/16* (2006.01)

(52) U.S. Cl.
CPC ......... *G02B 27/0176* (2013.01); *G06F 1/163* (2013.01)

(58) Field of Classification Search
CPC ........ G02B 27/0176; G02B 2027/0132; G02B 27/01; G02B 27/0172; G06F 1/163; G06F 3/011
See application file for complete search history.

(56) References Cited

U.S. PATENT DOCUMENTS

| | | | | |
|---|---|---|---|---|
| 5,844,530 | A * | 12/1998 | Tosaki | G02B 27/017 345/8 |
| 2007/0067894 | A1 | 3/2007 | Bourree et al. | |
| 2012/0075168 | A1* | 3/2012 | Osterhout | G06F 3/011 345/8 |
| 2016/0011422 | A1* | 1/2016 | Thurber | G02B 27/017 345/8 |
| 2016/0025981 | A1* | 1/2016 | Burns | G02B 27/0101 345/156 |
| 2016/0209654 | A1* | 7/2016 | Riccomini | G02B 27/017 |
| 2016/0209655 | A1* | 7/2016 | Riccomini | G02B 27/0176 |
| 2016/0253809 | A1* | 9/2016 | Cole | H04N 13/161 345/672 |
| 2016/0309143 | A1* | 10/2016 | Fu | H04N 13/344 |
| 2016/0373734 | A1* | 12/2016 | Cole | H04N 17/002 |

(Continued)

FOREIGN PATENT DOCUMENTS

| | | |
|---|---|---|
| CN | 1725828 A | 1/2006 |
| CN | 101846805 A | 9/2010 |

(Continued)

OTHER PUBLICATIONS

World Intellectual Property Organization (WIPO) International Search Report for PCT/CN2017/074144 dated Sep. 27, 2017 6 pages.

*Primary Examiner* — Ibrahim A Khan
(74) *Attorney, Agent, or Firm* — Anova Law Group, PLLC

(57) ABSTRACT

A wearable device includes a load-carrying device and an optomechanical device detachably mounted at a side of the load-carrying device. The optomechanical device includes a display screen configured to display an image and an optical assembly configured to project the image.

20 Claims, 7 Drawing Sheets

(56) References Cited

U.S. PATENT DOCUMENTS

2017/0068094 A1* 3/2017 Webster ............. G02B 27/0172
2017/0160801 A1* 6/2017 Miyaguchi ............ G06F 3/0304

FOREIGN PATENT DOCUMENTS

| | | |
|---|---|---|
| CN | 203573030 U | 4/2014 |
| CN | 104898281 A | 9/2015 |
| CN | 205374874 U | 7/2016 |
| CN | 104995546 B | 5/2017 |
| CN | 107003527 A | 8/2017 |
| CN | 107077000 A | 8/2017 |
| CN | 106019602 B | 3/2018 |
| KR | 20140025121 A | 3/2014 |
| WO | 2008081971 A1 | 7/2008 |
| WO | 2016052135 A1 | 4/2016 |

* cited by examiner

WEARABLE DEVICE

CROSS-REFERENCE TO RELATED APPLICATION

This application is a continuation application of International Application No. PCT/CN2017/074144, filed on Feb. 20, 2017, which claims priority to Chinese Application No. 201621493017.6, filed on Dec. 30, 2016, the entire contents of both of which are incorporated herein by reference.

TECHNICAL FIELD

The present disclosure relates to virtual reality (VR) technology and, more particularly, to a wearable device.

REARGROUND

Wearable devices, such as virtual reality (VR) glasses or augmented reality (AR) glasses, generally include a plurality of optical components. However, the optical components are easily damaged if the wearable device is dropped, causing the entire wearable device to be scrapped.

SUMMARY

In accordance with the disclosure, there is provided a wearable device including a load-carrying device and an optomechanical device detachably mounted at a side of the load-carrying device. The optomechanical device includes a display screen configured to display an image and an optical assembly configured to project the image.

DESCRIPTION OF MAIN COMPONENTS AND REFERENCE NUMERALS

Figure 1:
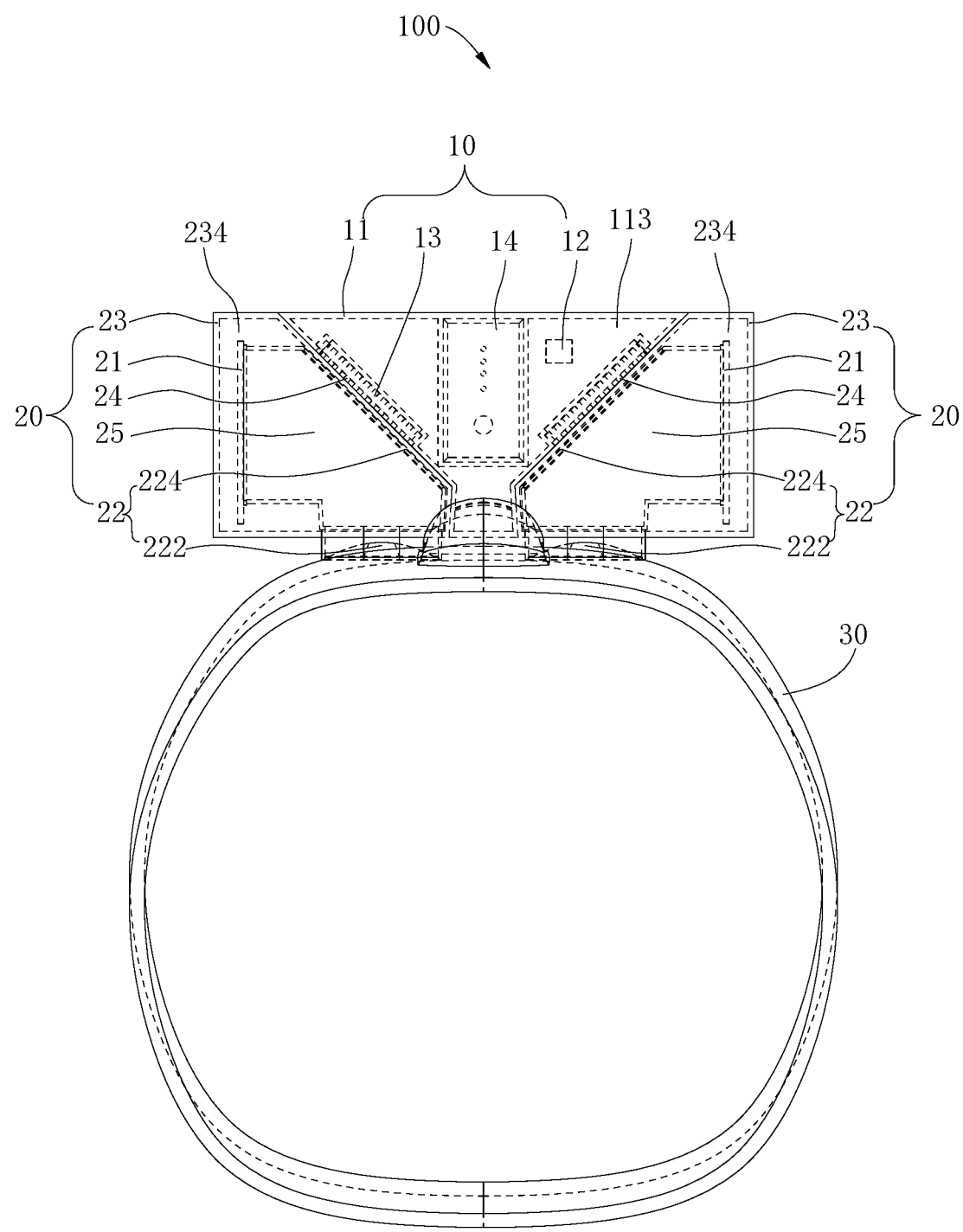
FIG. 1 is a schematic planar assembled view of a wearable device according to an embodiment of the disclosure.

Wearable device 100
Load-carrying device 10
Middle housing 11
Top surface 110
Bottom surface 111
Side surface 112
Connecting hole 132
Front surface 114
Rear surface 115
First hatch 1152
First buckle 116
Processing apparatus 12
First connector 13
Power supply apparatus 14
Optomechanical device 20
Display screen 21
Optical assembly 22
Eyepiece 222
Reflective component 224
Semi-transparent component 226
Light-adjustable component 228
Side housing 23
Connecting surface 232
First cavity 234
Through hole 236
Second connector 24
Protruding plate 242
Second connecting terminal 244
Optomechanical housing 25
Second mounting surface 251
Third mounting surface 252
Second cavity 253
Fourth mounting surface 254
Mounting hole 2542
Headband 30
Second buckle 32

DETAILED DESCRIPTION OF THE EMBODIMENTS

Example embodiments will be described with reference to the accompanying drawings, in which the same numbers refer to the same or similar elements unless otherwise specified.

It is intended that the embodiments be considered as example only and not to limit the scope of the disclosure.

FIG. 1 a schematic planar assembled view of a wearable device 100 consistent with the disclosure. As shown in FIG. 1, the wearable device 100 includes a load-carrying device 10, two optomechanical devices 20, and a headband 30.

The load-carrying device 10 includes a middle housing 11, a processing apparatus 12, a first connector 13, and a power supply apparatus 14.

Figure 2:
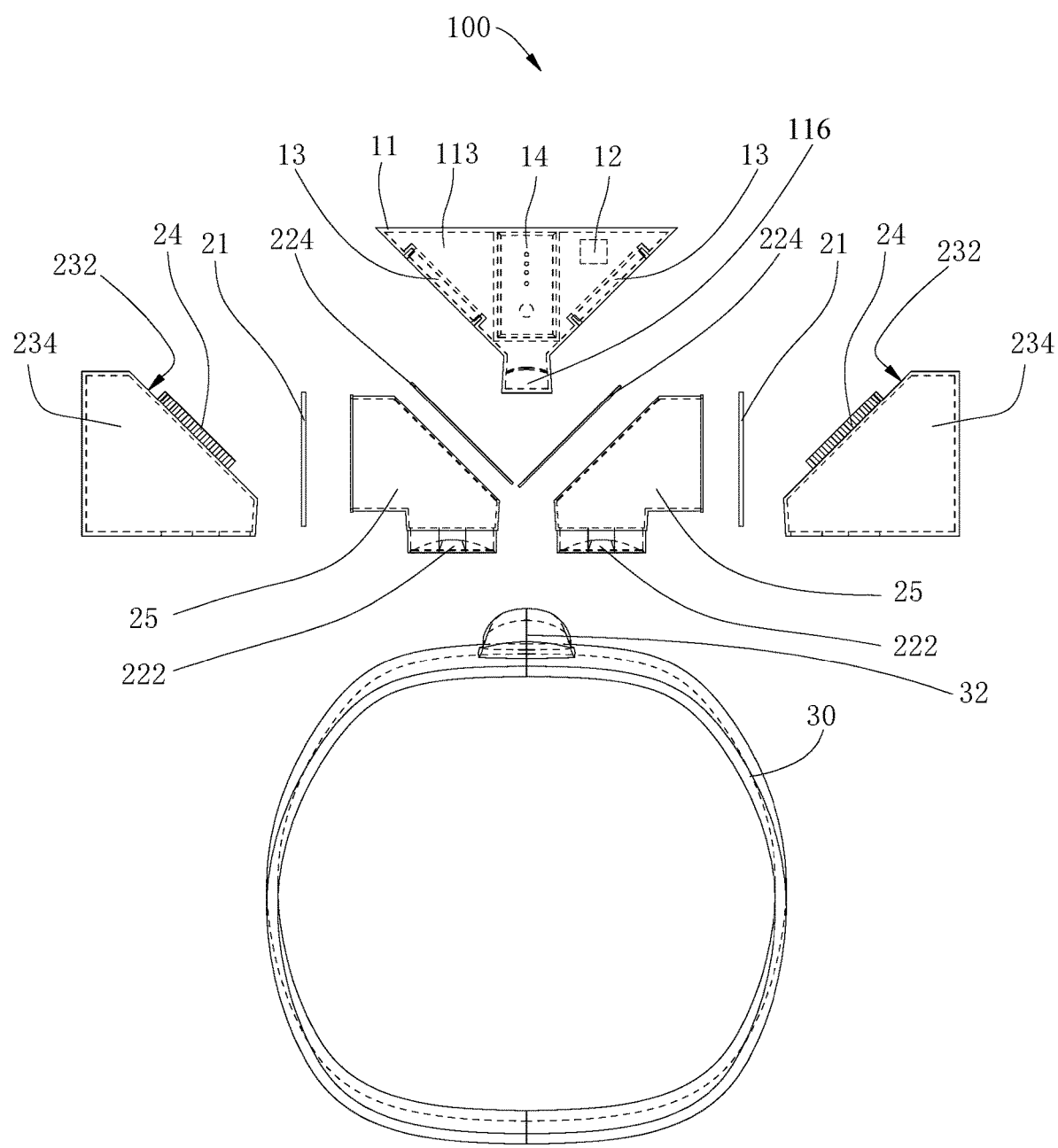
FIG. 2 is a planar exploded view of a wearable device according to an embodiment of the disclosure.
Figure 3:
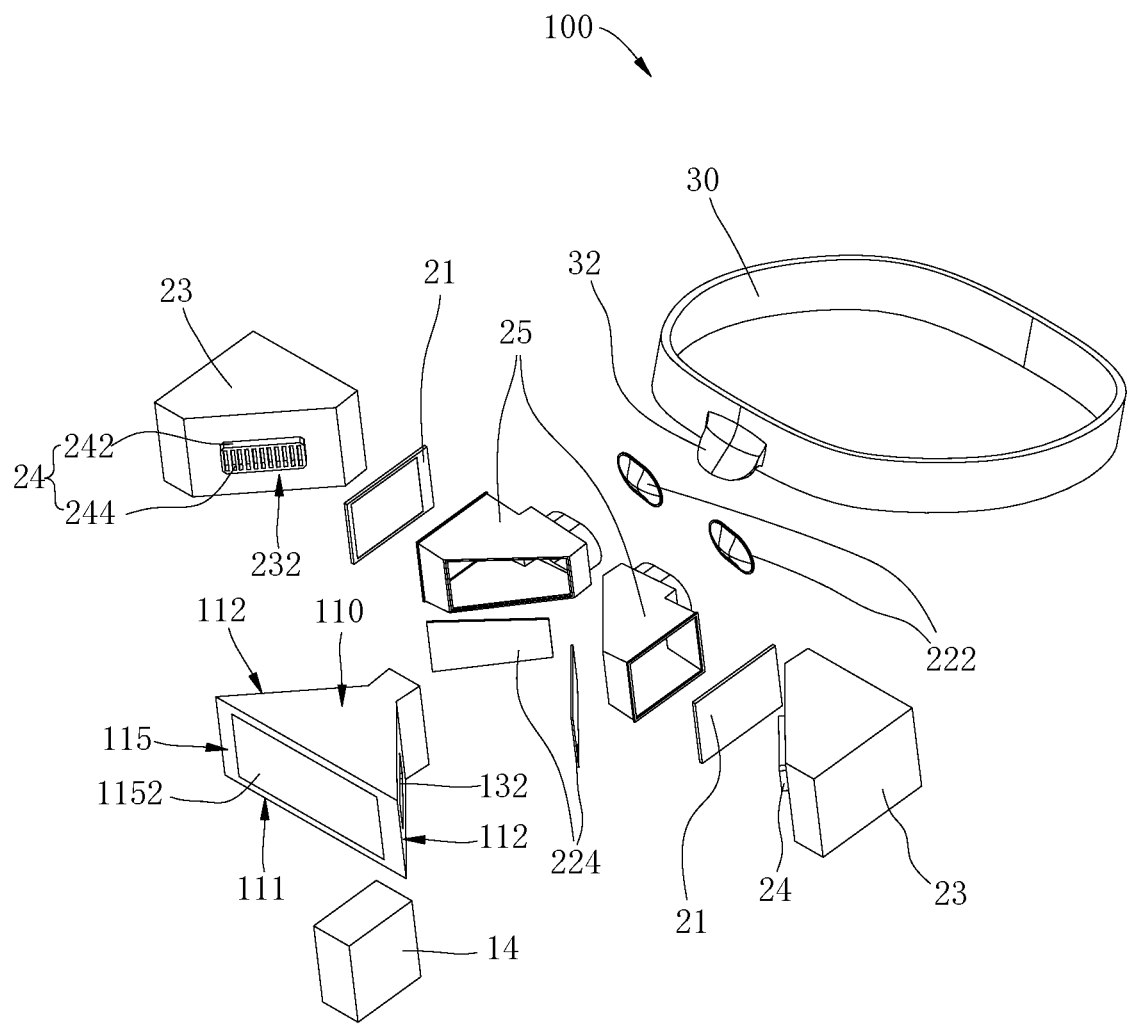
FIG. 3 is a perspective exploded view of a wearable device according to an embodiment of the disclosure.
Figure 4:
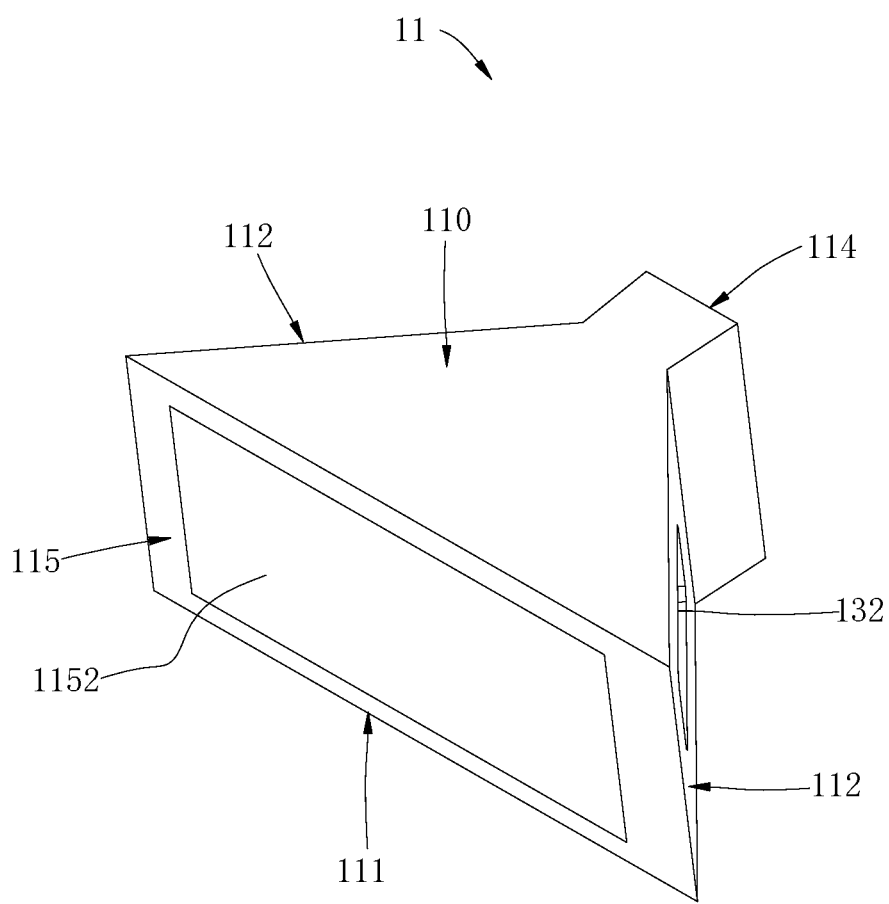
FIG. 4 is a three-dimensional (3D) structure diagram of a middle housing according to an embodiment of the disclosure.

FIG. 2 is a planar exploded view of the wearable device 100 consistent with the disclosure. FIG. 3 is a perspective exploded view of the wearable device 100 consistent with the disclosure. FIG. 4 is a three-dimensional (3D) structure diagram of the middle housing 11 consistent with the disclosure. As shown in FIGS. 2 to 4, the middle housing 11 includes a top surface 110, a bottom surface 111, two side surfaces 112, a front surface 114, and a rear surface 115. The top surface 110 and the bottom surface 111 are located at the top and bottom sides of the middle housing 11, respectively. The two side surfaces 112 are respectively located at two sides of the middle housing 11 and the two side surfaces 112 are opposite to each other. The front surface 114 and the rear surface 115 are located between the two side surfaces 112, and the front surface 114 and the rear surface 115 are respectively located at opposite sides of the middle housing 11. The two side surfaces 112, the front surface 114, and the rear surface 115 are connected to both the top surface 110 and the bottom surface 111.

In some embodiments, an angle between the two side surfaces 112 is an acute angle. A cross section of the middle housing 11 that is obtained by cutting the middle housing 11 by a plane parallel to the top surface 110 includes two portions connected to each other. One of the two portions has an isosceles-trapezoid shape and another one of the two portions has a rectangular shape. The two side surfaces 112 are respectively located at two waists of the isosceles trapezoid, and the front surface 114 is located at a side of the rectangular distal from the isosceles trapezoid. In some other embodiments, the cross section of the middle housing 11 that is obtained by cutting the middle housing 11 by the plane parallel to the top surface 110 is not limited to the above-described manner, and may include only a portion, and the portion may have a rectangular, triangular, or another regular shape, or another irregular shape. When the cross section is a rectangular, the two side surfaces 112 can be parallel to each other.

The middle housing 11 includes a receiving slot 113 which is formed by the top surface 110, the bottom surface 111, the two side surfaces 112, the front surface 114, and the rear surface 115. A first hatch 1152 can be provided at any one of the top surface 110, the bottom surface 111, the two side surfaces 112, the front surface 114, and the rear surface 115. In some embodiments, as shown in FIGS. 3 and 4, the first hatch 1152 is provided at the rear surface 115, and the first hatch 1152 can be opened and closed for arranging components into the receiving slot 113 and sealing the components in the receiving slot 113. In some other embodiments, the first hatch 1152 can be provided at another surface, e.g., the front surface 114, the rear surface 115, or one of the two side surfaces 112. The middle housing 11 is provided with a first buckle 116 at an end of the front surface 114.

A processing apparatus 12 is arranged inside the middle housing 11. In some embodiments, after the first hatch 1152 is opened, the processing apparatus 12 can be detachably mounted inside the receiving slot 113. The processing apparatus 12 can be configured to process data and control an operation of the wearable device 100.

In some embodiments, the first connector 13 can have both a mechanical connection and an electrical connection. That is, the first connector 13 can be configured to be detachably and mechanically connected to the optomechanical device 20, and the first connector 13 can also be electrically coupled to the optomechanical device 20. The processing apparatus 12 can be electrically coupled to the optomechanical device 20 via the first connector 13. The number of the first connectors 13 can be two and the two first connectors 13 can be arranged at middle positions of the two side surfaces 112, respectively. In some other embodiments, the number of first connectors 13 at each side surface 112 may be two, three or more, and the number of first connectors 13 on the two side surfaces 112 can be equal or unequal. The first connector 13 can be arranged at any other location on the side surface 112, for example, the first connector 13 can be arranged adjacent to any edge of the side surface 112.

The power supply apparatus 14 can be detachably arranged inside the slot 113. In some embodiments, after the first hatch 1152 is opened, the power supply apparatus 14 can be detachably mounted inside the receiving slot 113. The power supply apparatus 14 can be electrically coupled to the first connector 13, and the power supply apparatus 14 can be configured to supply power to the optomechanical device 20 via the first connector 13. The power supply apparatus 14 can include any one or more of a rechargeable battery, a dry battery, a fuel battery, a solar battery, or the like.

Figure 5:
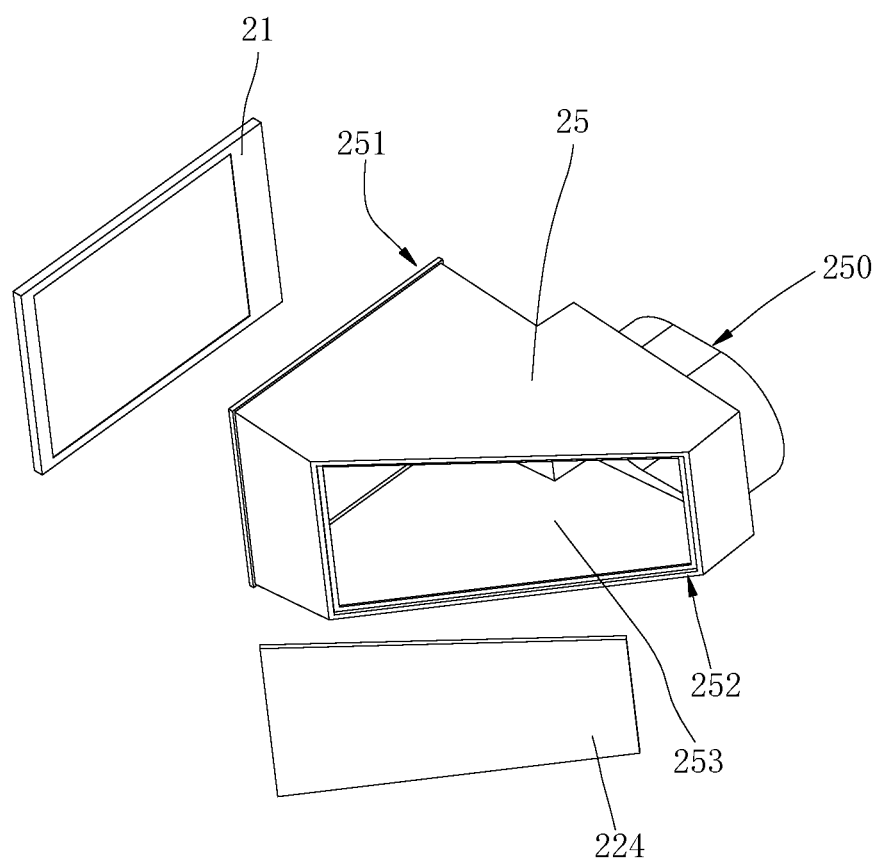
FIG. 5 is a perspective exploded view of an optomechanical housing, a display screen, and an optical assembly according to an embodiment of the disclosure.

FIG. 5 a perspective exploded view of an optomechanical housing 25, a display screen 21, and an optical assembly 22 consistent with the disclosure. As shown in FIGS. 1, 2, 3, and 5, each optomechanical device 20 includes the display screen 21, the optical assembly 22, two side housings 23, a second connector 24, and an optomechanical housing 25.

Each side housing 23 includes a connecting surface 232 which is connected to the side surface 112 of the middle housing 11, and the two side housings 23 can be detachably mounted at the two side surfaces 112 of the middle housing 11, respectively. In some embodiments, the side housing 23 can be fixed to the side surface 112 by a screw connection, a snap fit, or the screw connection in combination with the snap fit. A first cavity 234 is formed inside the side housing 23. A second hatch (not shown in FIG. 5) can be arranged at a side of the side housing 23, and the second hatch may be arranged at any side of the side housing 23. The second hatch can be opened and closed for arranging the components into the first cavity 234 and sealing the component in the first cavity 234.

The second connector 24 can have both a mechanical connection and an electrical connection. That is, the second connector 24 can be configured to be detachably connected to the first connector 13 to achieve the mechanical connection, and at the same time, the second connector 24 can be inserted into the first connector 13 to achieve the electrical connection. The number and position of the second connectors 24 are consistent with the number and position of the first connectors 13. The mechanical connection between the second connector 24 and the first connector 13 can be used to fix the two side housings 23 to the middle housing 11 by a screw connection, a snap fit, or the screw connection combined with the snap fit. The power supply apparatus 14 and the processing apparatus 12 can be electrically coupled to the optomechanical device 20 via the second connector 24 and the first connector 13. For example, the power supply apparatus 14 can be electrically coupled to the optomechanical device 20 via the first connector 13 and the second connector 24 to supply power to the optomechanical device 20, and the processing apparatus 12 can be electrically coupled to the optomechanical device 20 via the first connector 13 and the second connector 24 to provide the optomechanical device 20 with data signals, control signals, and/or the like.

In some embodiments, the first connector 13 includes a connecting hole 132 and a first connecting terminal (not shown in FIG. 3) arranged at an end of the connecting hole 132. The second connector 24 includes a protruding plate 242 and a second connecting terminal 244 arrange in the middle of the protruding plate 242. A shape of the connecting hole 132 can match with a shape of the protruding plate 242, and the first connecting terminal can match with the second connecting terminal 244. The connecting hole 132 can be engaged with the protruding plate 242 to realize the mechanical connection between the first connector 13 and the second connector 24. The first connecting terminal can be inserted into the second connecting terminal 244 to electrically couple the first connector 13 to the second connector 24.

In some embodiments, the connection between the second connector 24 and the first connector 13 can include only the mechanical connection. In this scenario, the power supply apparatus 14 and the processing apparatus 12 inside the middle housing 11 can be electrically coupled to the optomechanical device 20 by means of wires or the like.

The two optomechanical housings 25 can be detachably mounted inside the first cavity 234 of the corresponding side housings 23, respectively. In some embodiments, after the second hatch is opened, the optomechanical housing 25 can be detachably mounted inside the first cavity 234. Each optomechanical housing 25 includes a first mounting surface 250, a second mounting surface 251, and a third mounting surface 252. The first mounting surface 250 is connected to the second mounting surface 251. The third mounting surface 252 is obliquely connected to the first mounting surface 250 and the second mounting surface 251, and the third mounting surface 252 corresponds to the connecting surface 232 and the side surface 112. The first mounting surface 250, the second mounting surface 251, and the third mounting surface 252 form a second cavity 253 for ensuring that light can propagate within the optomechanical housing 25.

The display screen 21 is arranged at the second mounting surface 251. In some embodiments, the display screen 21 can be fixed to the corresponding second mounting surface 251 by a screw connection, a snap fit, or the screw connection combined with the snap fit. In this scenario, the display screen 21 can be detachably mounted at the optomechanical housing 25. In some other embodiments, the display screen 21 can be fixed to the corresponding second mounting surface 251 by gluing, welding, or the like. In this scenario, the display screen 21 can be non-detachably mounted at the optomechanical housing 25. The display screen 21 can be configured to display an image. In some embodiments, display of the image displayed on the display screen 21 can be controlled by the processing apparatus 12. The display screen 21 can include a Liquid Crystal Display (LCD) display or an Organic Light-Emitting Diode (OLED) display.

The optical assembly 22 includes an eyepiece 222 and a reflective component 224. The eyepiece 222 can include a convex lens, a concave lens, a lens group formed by a plurality of convex lenses, a lens group formed by a plurality of concave lenses, or a lens group formed by at least one convex lens and at least one concave lens. The convex lens can be configured to further enlarge the image, improve a field of view (FOV), and improve the immersion. The concave lens can be configured to limit the FOV and allow only a certain range of light to pass through the lens group. The reflective component 224 can include, but is not limited to, any one of a reflective film and a reflective mirror. The reflective component 224 can reflect the image displayed by the display screen 21 and project the image onto eyes of a wearer who is wearing the wearable device 100 via the eyepiece 222.

The eyepiece 222 is arranged at the first mounting surface 250 and the reflective component 224 is arranged at the third mounting surface 252. An angle between the reflective component 224 and the first mounting surface 250 is an acute angle. An angle between the reflective component 224 and the second mounting surface 251 is also an acute angle. In some embodiments, the eyepiece 222 and the reflective component 224 can be fixed to the corresponding mounting surface by means of a screw connection, a snap fit, or the screw connection combined with the snap fit. In this scenario, the eyepiece 222 and the reflective component 224 can be detachably mounted at the optomechanical housing 25. In some other embodiments, the eyepiece 222 and the reflective component 224 can be fixed to the corresponding mounting surface by gluing, welding, or the like. In this scenario, the eyepiece 222 and the reflective component 224 can be non-detachably mounted at the optomechanical housing 25. The reflective component 224 is configured to reflect the image displayed by display screen 21. The reflective component 224 has the reflective function and follows the law of reflection to ensure that the reflected image is clear and fidelity. The image reflected by the reflective component 224 does not appear a distortion due to a change in the distance between a light source and a mirror surface. The eyepiece 222 can project the image reflected by the reflective component 224 onto the eyes of the wearer who is wearing the wearable device 100.

The headband 30 is configured to be worn on the wearer's head. The headband 30 includes a second buckle 32 that can cooperate with the first buckle 116 arranged at the middle housing 11. The middle housing 11 can be detachably mounted on the headband 30 by an engagement of the first buckle 116 and the second buckle 32. In some other embodiments, the middle housing 11 and the headband 30 are not limited to the snap fit, and the middle housing 11 can be fixed on the headband 30 by means of the screw connection, the snap fit, or the screw connection combined with the snap fit. In some other embodiments, the middle housing 11 and the headband 30 may be one-piece molded or integrally connected by welding.

In some embodiments, the image displayed by the display screen 21 can be reflected by reflective component 224 and projected the image onto both eyes of the wearer who is wearing the wearable device 100 via the eyepiece 222, such that the wearer can see the image displayed by the display screen 21. The display screens 21 of the two optomechanical devices 20 can be controlled by the processing apparatus 12 to display different images, a left eye can see an image displayed on one of the display screens 21, and a right eye can see another image displayed on another one of the display screens 21. Since the images displayed by the two display screens 21 are different, the images seen by the two eyes have parallax, and hence a 3D feeling can be generated.

In some embodiments, the wearable device 100 includes the load-carrying device 10 and the optomechanical device 20 detachably mounted together through a first connector 13 arranged at the load-carrying device 10 and a second connector 24 arranged at the optomechanical device 20. The optical components, such as the display screen 21 and the optical assembly 22, can be integrated into the optomechanical device 20, such that when the wearable device 100 is damaged due to dropping, the damaged component can be easily replaced and the component can be used continuously to avoid the entire wearable device 100 being scrapped due to damage of some components. Furthermore, the processing apparatus 12, the first connector 13, and the power supply apparatus 14 inside the load-carrying device 10 can be detachably mounted together, and the side housings 23, the display screens 21, and the optical assemblies 22 in the optomechanical device 20 can be also detachably mounted together, such that the replacement of the components can be facilitated when some components of the wearable device 100 are damaged.

Figure 6:
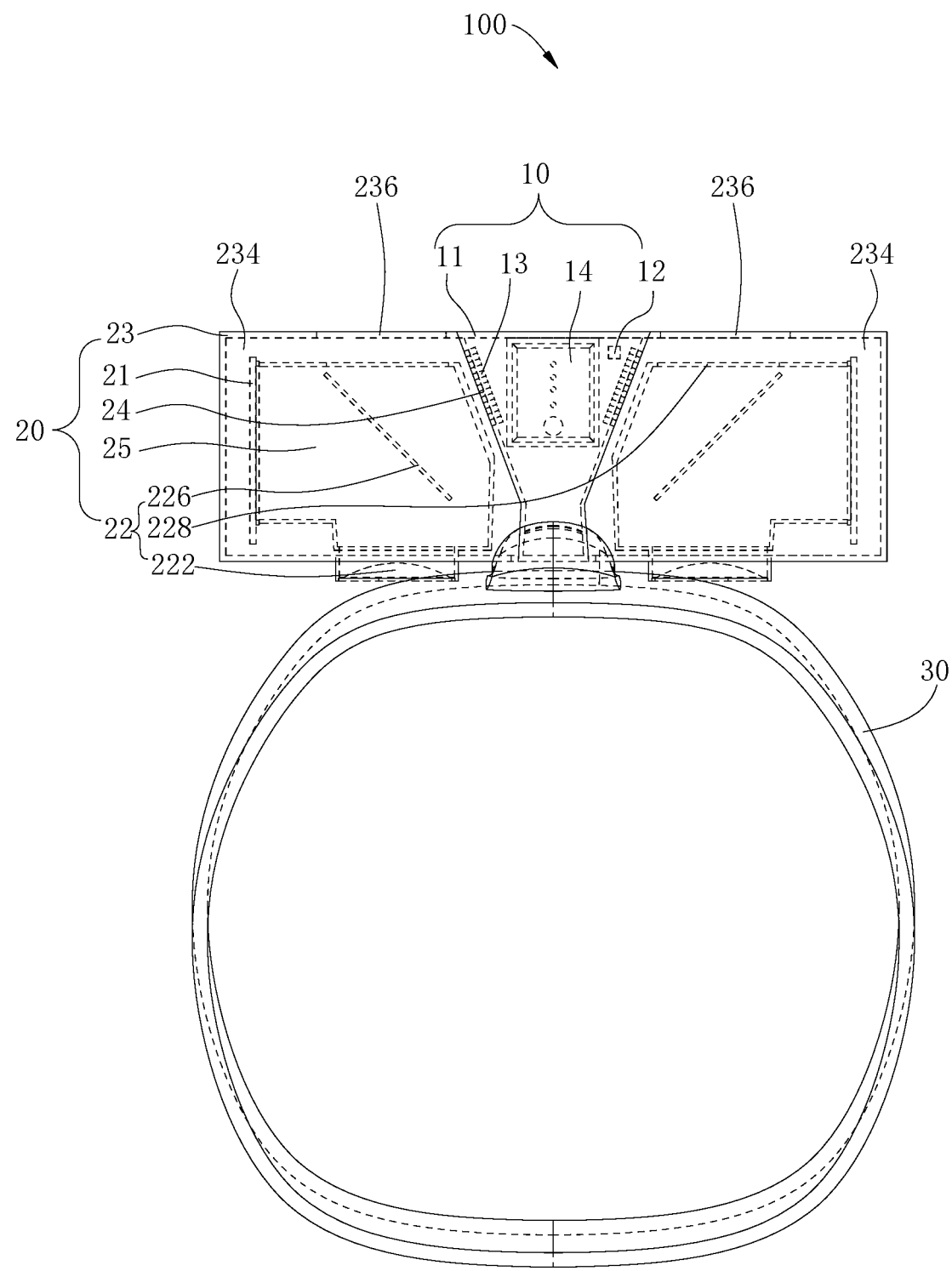
FIG. 6 a schematic view of another planar assembly of a wearable device according to an embodiment of the disclosure.
Figure 7:
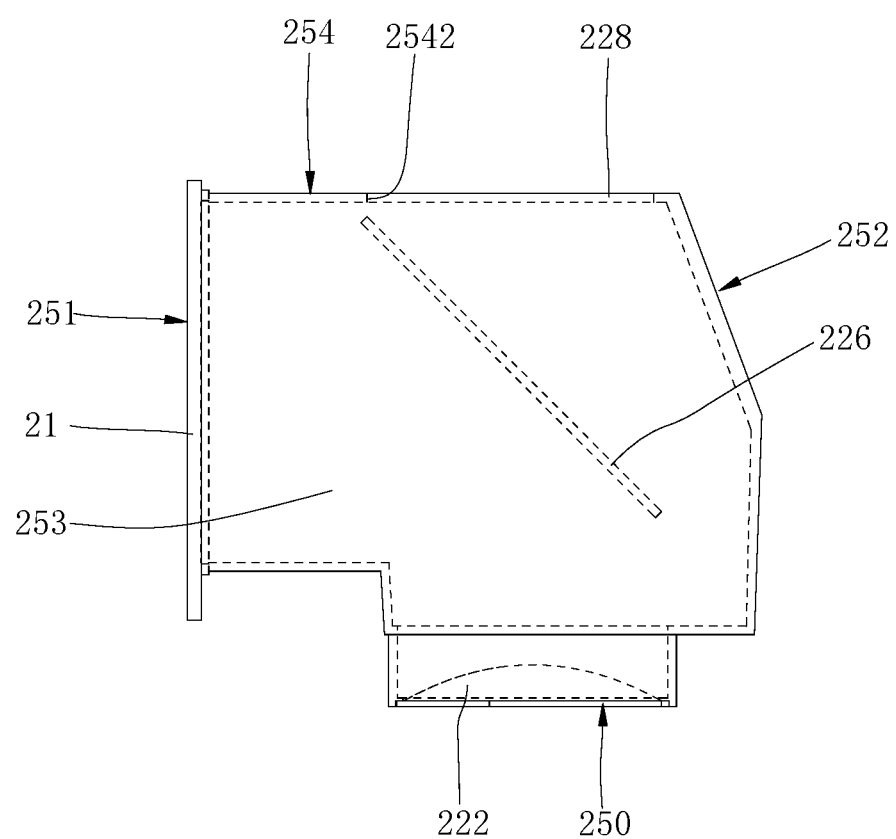
FIG. 7 is a schematic planar view of an optomechanical housing, a display screen, and an optical assembly according to an embodiment of the disclosure.

FIG. 6 a schematic view of another planar assembly of the wearable device 100 consistent with the disclosure. FIG. 7 is a schematic planar view of the optomechanical housing 25, the display screen 21, and the optical assembly 22 consistent with the disclosure. As shown in FIGS. 6 and 7, in some embodiments, each optomechanical housing 25 includes the first mounting surface 250, the second mounting surface 251, the third mounting surface 252, and the fourth mounting surface 254. The first mounting surface 250 is connected to the second mounting surface 251. The third mounting surface 252 is obliquely connected to the first mounting surface 250 and the second mounting surface 251, and the third mounting surface 252 corresponds to the connecting surface 232 and the side surface 112. The fourth mounting surface 254 is connected between the second mounting surface 251 and the third mounting surface 252 and opposite to the first mounting surface 250. The first mounting surface 250, the second mounting surface 251, the third mounting surface 252, and the fourth mounting surface 254 form a second cavity 253 for ensuring that light can propagate within the optomechanical housing 25.

The display screen 21 is arranged at the second mounting surface 251. The display screen 21 can include an LCD display or an OLED display.

The optical assembly 22 includes the eyepiece 222, a semi-transparent component 226 (also referred to as "semi-transparent-semi-reflective component"), and a light-adjustable component 228. The eyepiece 222 can include a convex lens, a concave lens, a lens group formed by a plurality of convex lenses, a lens group formed by a plurality of concave lenses, or a lens group formed by at least one convex lens and at least one concave lens. The convex lens can be configured to further enlarge the image, improve a field of view (FOV), and improve the immersion. The concave lens can be configured to limit the FOV and allow only a certain range of light to pass through the lens group. The semi-transparent component 226 can include, but is not limited to, any one of a transparent glass, a semi-transparent film, or the like. The light-adjustable component 228 can include, but is not limited to, light-adjustable glass, a light-adjustable film, or the like. The light-adjustable component 228 can change its light transmittance by any means, such as an electronic control, temperature control, light control, voltage control, or the like, such that light having different luminous fluxes can be transmitted through the light-adjustable component 228 and reach the semi-transparent component 226. The semi-transparent component 226 can reflect the image displayed by the display screen 21 and project the image onto the eyes of the wearer who is wearing the wearable device 100 via the eyepiece 222, and can transmit light that is transmitted through the light-adjustable component 228 and project the light onto the eyes of the wearer who is wearing the wearable device 100 via the eyepiece 222.

The eyepiece 222 is arranged at the first mounting surface 250. The semi-transparent components 226 are arranged between the second mounting surface 251 and the third mounting surface 252 and between the first mounting surface 250 and the fourth mounting surface 254, and the semi-transparent component 226 is inclined relative to both the first mounting surface 250 and the fourth mounting surface 254. The light-adjustable component 228 is arranged at the fourth mounting surface 254 and opposite to the semi-transparent component 226. A through hole 236 is provided in a side of each side housing 23 opposite to the fourth mounting surface 254, such that light from the external environment of the wearable device 100 can enter from the through hole 236 and be transmitted to the light-adjustable component 228. The mounting hole 2542 is provided at the fourth mounting surface 254, and the light-adjustable component 228 is mounted in the mounting hole 2542, or the fourth mounting surface 254 is made of a light transmissive material and the light-adjustable component 228 can be mounted at the fourth mounting surface 254. The light transmissive material may be any one of glass, polyvinylidene fluoride (PDVF), or the like.

The eyepiece 222, the display screen 21, the semi-transparent component 226, and the light-adjustable component 228 can be fixed to the corresponding mounting surface by a screw connection, a snap fit, or the screw connection combined with the snap fit. In this scenario, the eyepiece 222, the display screen 21, the semi-transparent component 226, and the light-adjustable component 228 can be detachably mounted at the optomechanical housing 25. In some other embodiments, the eyepiece 222, the display screen 21, the semi-transparent component 226, and the light-adjustable component 228 may be fixed to the corresponding mounting surface by gluing, welding, or the like. In this scenario, the eyepiece 222, the display screen 21, the semi-transparent component 226, and the light-adjustable component 228 can be non-detachably mounted at the optomechanical housing 25.

The display screen 21 is configured to display an image. In some embodiments, the image displayed by the display screen 21 can be controlled by the processing apparatus 12. The light-adjustable component 228 can be configured to change its light transmittance, such that light having different luminous fluxes can be transmitted through the light-adjustable component 228 and reach the semi-transparent component 226. The semi-transparent component 226 can be configured to reflect part of the light generated by the display screen 21 and project part of the light transmitted by the light-adjustable component 228, and further to transmit the light generated by the display screen 21 and the light transmitted by the light-adjustable component 228 to the eyepiece 222. The eyepiece 222 can magnify the light transmitted by the semi-transparent component 226 and project onto the eyes of the wearer who is wearing the wearable device 100.

When the light-adjustable component 228 is adjusted to be fully transparent, the light of an external environment of the wearable device 100 can be transmitted to the semi-transparent component 226 via the light-adjustable component 228, and then transmitted to the eyepiece 222 via the semi-transparent component 226. In the meanwhile, the light generated by the display screen 21 can be transmitted to the semi-transparent component 226, and then transmitted to the eyepiece 222 after reflected by the semi-transparent component 226. The light of the external environment transmitted to the eyepiece 222 and the light generated by the display screen 21 can be superimposed and then projected onto glasses of the wearer who is wearing the wearable device 100, such that a reality environment can be superimposed with a virtual environment displayed by the display screen 21 to form an AR effect. When the light-adjustable component 228 is adjusted to be completely opaque, the light generated by the display screen 21 can be reflected by the semi-transparent component 226 and transmitted by the eyepiece 222, and then projected onto the glasses of the wearer who is wearing the wearable device 100, such that the wearer can view the VR effect.

The wearable device 100 can be detachably mounted by the load-carrying device 10 and the optomechanical device 20 through the first connector 13 arranged at the load-carrying device 10 and the second connector 24 arranged at the optomechanical device 20. Therefore, when the wearable device 100 is damaged due to dropping, the damaged component can be easily replaced and the component can be used continuously to avoid the entire wearable device 100 being scrapped due to damage of some components. Furthermore, the wearable device 100 can implement both the AR function and the VR function.

As used herein, unless otherwise defined, when a first component is referred to as "above" or "below" a second component, it is intended that the first component may be directly attached to the second component or may be indirectly attached to the second component via another component. When the first component is referred to as "over," "above," or "on top of" the second component, it is intended that the first component may be directly above or obliquely above the second component, or merely that a horizontal height of the first component may be higher than the horizontal height of the second component.

As used herein, the terms "certain embodiment," "an embodiment," "some embodiments," "an example," "certain example," "some examples," or the like, refer to that the specific features, structures, materials, or characteristics described in connection with the embodiments or examples are included in at least one embodiment or example of the disclosure. The illustrative representations of the above terms are not necessarily referring to the same embodiments or examples. Furthermore, the specific features, structures, materials, or characteristics described may be combined in a suitable manner in any one or more embodiments or examples. In the situation where the features described in the embodiments are not conflicting, they can be combined.

It is intended that the embodiments disclosed herein be considered as example only and not to limit the scope of the disclosure. Changes, modifications, alterations, and variations of the above-described embodiments may be made by those skilled in the art within the scope of the disclosure.

What is claimed is:

1. A wearable device comprising:
   a load-carrying device including a first connector; and
   an optomechanical device detachably mounted at a side of the load-carrying device, the optomechanical device including:
      a display screen configured to display an image;
      an optical assembly configured to project the image; and
      a second connector corresponding to the first connector;
   wherein the first connector and the second connector are configured to be connected to each other to detachably mount the optomechanical device at a side of the load-carrying device and to electrically couple the optomechanical device to the load-carrying device.

2. The device of claim 1, wherein:
   the load-carrying device includes a middle housing; and
   the optomechanical device further includes a side housing detachably mounted at the middle housing.

3. The device of claim 2, wherein:
   the load-carrying device further includes a processing apparatus arranged inside the middle housing and configured to process data and control an operation of the wearable device.

4. The device of claim 2, wherein:
   the middle housing includes two side surfaces, the two side surfaces being located at two sides of the middle housing; and
   the side housing is mounted at one of the two side surfaces.

5. The device of claim 4, wherein an angle between the two side surfaces is an acute angle.

6. The device of claim 4, wherein:
   the first connector is arranged at one of the two side surfaces;
   the side housing includes a connecting surface connected to the middle housing;
   the second connector is arranged at the connecting surface; and
   the first connector is connected to the second connector to detachably mount the side housing to the middle housing.

7. The device of claim 6, wherein:
   the load-carrying device further includes a power supply apparatus arranged inside the middle housing; and
   the power supply apparatus is configured to provide power to the optomechanical device via the first connector and the second connector.

8. The device of claim 7, wherein the power supply apparatus includes a rechargeable battery.

9. The device of claim 7, wherein:
   the middle housing further includes a receiving slot; and
   the power supply apparatus is arranged inside the receiving slot.

10. The device of claim 4, further comprising:
    a headband including a first buckle;
    wherein:
       the middle housing further includes a front surface connected between the two side surfaces;
       a second buckle is arranged at the front surface; and
       the middle housing is detachably mounted at the headband through the first buckle and the second buckle.

11. The device of claim 2, further comprising:
    a headband;
    wherein:
       the middle housing is fixed to the headband via screw connection, snap fit, or a combination of screw connection and snap fit; or
       the middle housing and the headband are integrally formed as one piece.

12. The device of claim 2, wherein:
    the optomechanical device further includes an optomechanical housing arranged inside the side housing and including:
       a first mounting surface;
       a second mounting surface connected to the first mounting surface, the display screen being arranged at the second mounting surface; and
       a third mounting surface obliquely connected to the first mounting surface and the second mounting surface; and
    the optical assembly includes:
       an eyepiece arranged at the first mounting surface; and
       a reflective component arranged at the third mounting surface and configured to reflect the image toward the eyepiece.

13. The device of claim 12, wherein:
    an angle between the reflective component and the first mounting surface is an acute angle; and
    an angle between the reflective component and the second mounting surface is an acute angle.

14. The device of claim 12, wherein the display screen includes a Liquid Crystal Display (LCD) display or an Organic Light-Emitting Diode (OLED) display.

15. The device of claim 2, wherein:
    the optomechanical device further includes an optomechanical housing arranged inside the side housing and including:
       a first mounting surface;
       a second mounting surface connected to the first mounting surface, the display screen being arranged at the second mounting surface; and
       a third mounting surface obliquely connected to the first mounting surface; and
    the optical assembly includes:
       an eyepiece arranged at the first mounting surface; and
       a semi-transparent component arranged between the second mounting surface and the third mounting surface and configured to reflect the image toward the eyepiece.

16. The device of claim 15, wherein:
    the optomechanical housing further includes a fourth mounting surface opposite to the first mounting surface and connected between the second mounting surface and the third mounting surface; and the optical assembly further includes a light-adjustable component arranged at the fourth mounting surface and opposite to the semi-transparent component, the light-adjustable component having an adjustable light transmittance and being configured to project light passing through the light-adjustable component toward the semi-transparent component.

17. The device of claim 16, wherein:
the fourth mounting surface includes a mounting hole, the light-adjustable component being mounted in the mounting hole; or
the fourth mounting surface is made of a light transmissive material.

18. The device of claim 16, wherein the light-adjustable component includes light-adjustable glass.

19. The device of claim 16, wherein the semi-transparent component is arranged between the first mounting surface and the fourth mounting surface, and is inclined relative to both the first mounting surface and the fourth mounting surface.

20. The device of claim 1,
wherein the optomechanical device is a first optomechanical device, the display screen is a first display screen, the image is a first image, and the optical assembly is a first optical assembly;
the wearable device further comprising:
a second optomechanical device detachably mounted at another side of the load-carrying device, the second optomechanical device including:
a second display screen configured to display a second image; and
a second optical assembly configured to project the second image.

* * * * *